May 2, 1961 R. R. McDONNELL 2,982,388
COIN CONTROLLED LOCKING MECHANISMS
Filed March 21, 1957 3 Sheets-Sheet 1
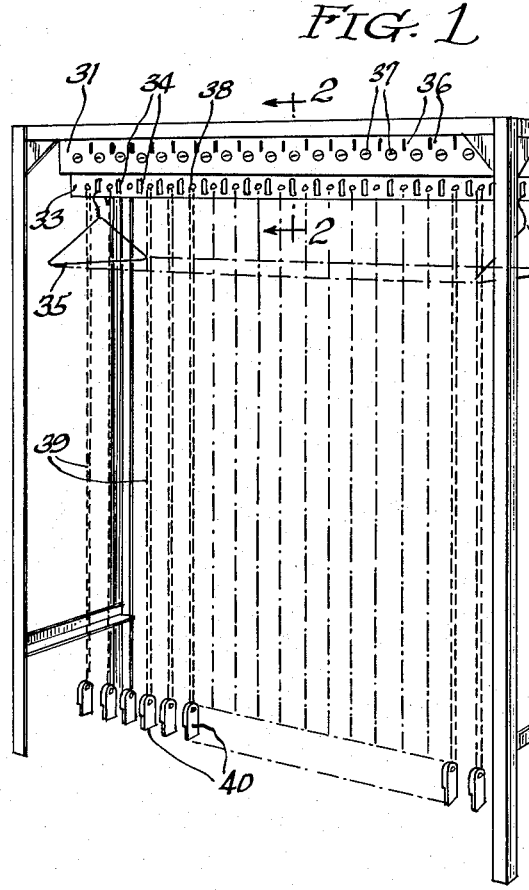
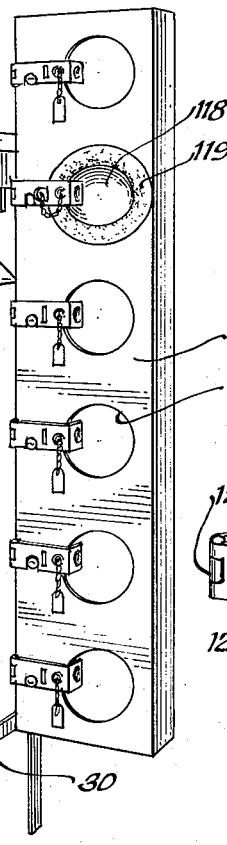
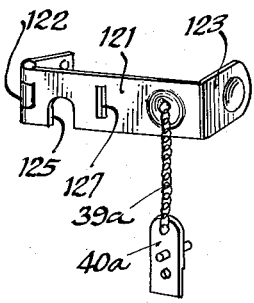
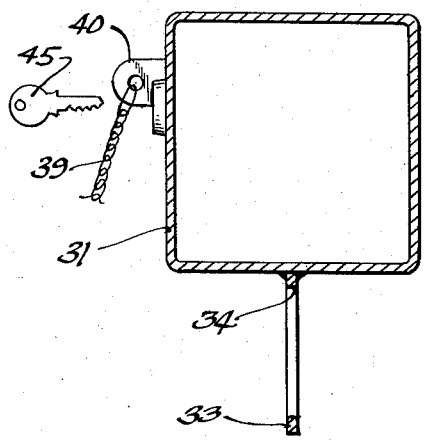
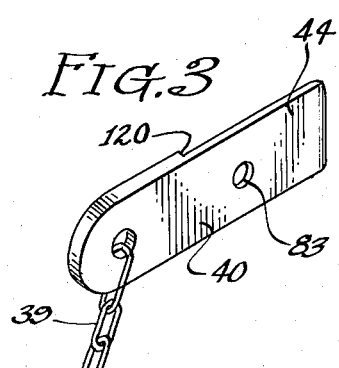
INVENTOR:
Ralph R. McDonnell
BY
Milo B. Stevens & Co.
Attorneys.

May 2, 1961  R. R. McDONNELL  2,982,388
COIN CONTROLLED LOCKING MECHANISMS
Filed March 21, 1957  3 Sheets-Sheet 2
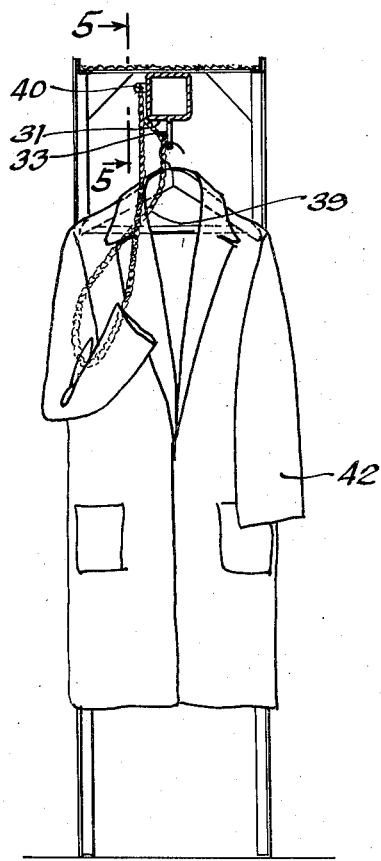
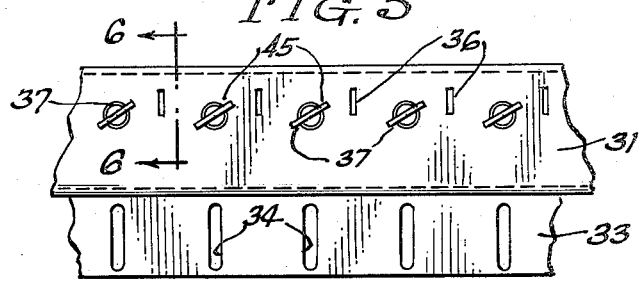
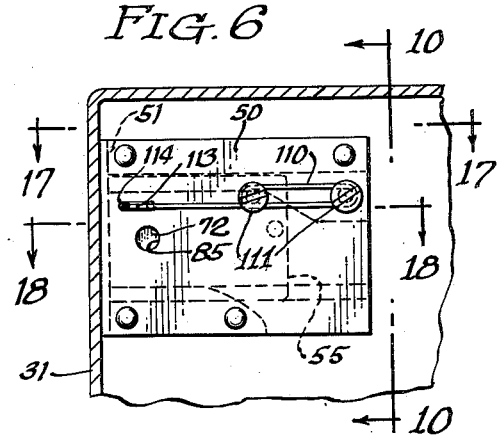
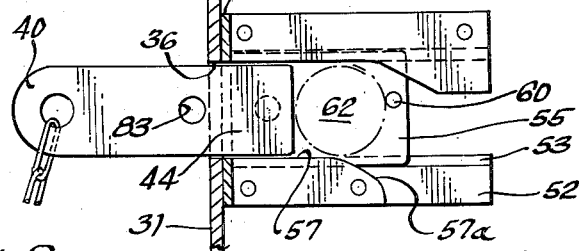
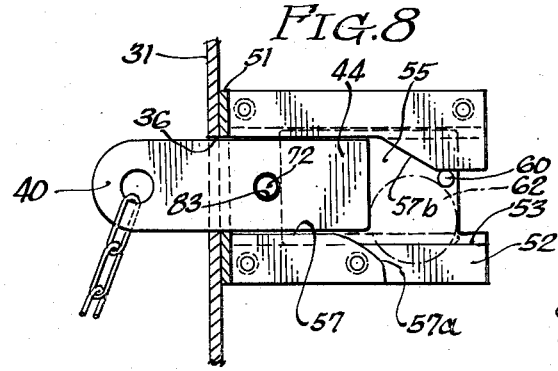
INVENTOR:
Ralph R. McDonnell
BY
Milo B. Stevens & Co.
Attorneys.

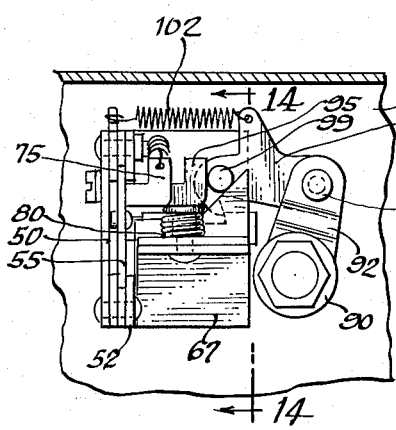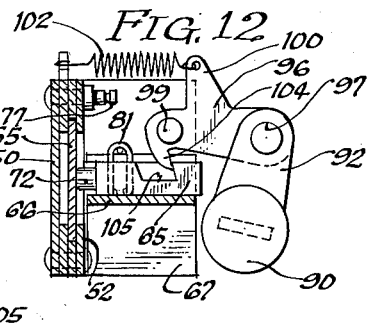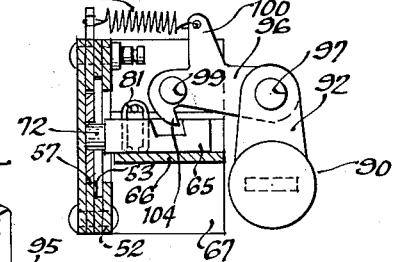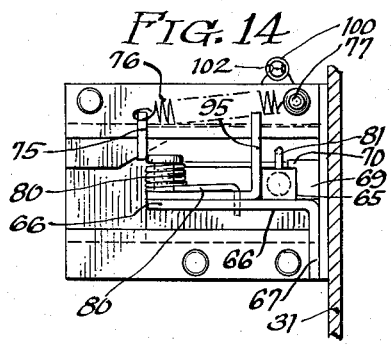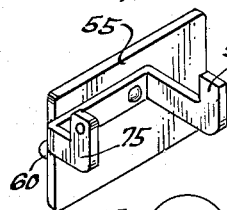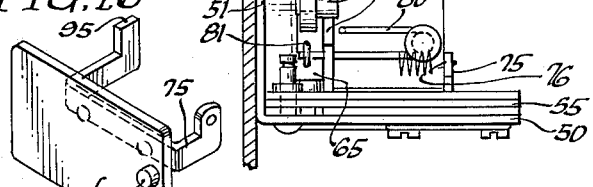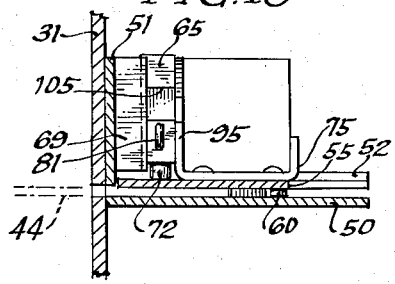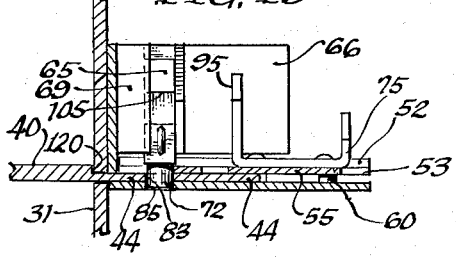

United States Patent Office 2,982,388
Patented May 2, 1961

2,982,388
COIN CONTROLLED LOCKING MECHANISMS
Ralph R. McDonnell, 17 Arlington Lane, Fox Lake, Ill.
Filed Mar. 21, 1957, Ser. No. 647,524
7 Claims. (Cl. 194—78)

My invention relates to locking mechanisms for garments, valises and other portable articles which are stored temporarily in public places, such as restaurants, cloakrooms, etc. For this purpose, it is customary to provide a rack or other support for the article and to employ a mechanism for retaining the article, such mechanism having a key and requiring a coin to render it operative. In the case of an overcoat, a supporting rack is engaged by the hanger on which the coat is placed; and a chain is extended from the rack for passage through the sleeve of the overcoat and application to a locking mechanism. The present invention is concerned with the latter only, and one of its objects is to provide a plunger on the end of the chain previously referred to, such plunger utilizing the coin inserted in the mechanism as a means to operate the same.

A further object is to provide a mechanism of the type mentioned in which a standard cylinder lock and key are contained, with the key normally locked against retraction, and removable only after the coin has been inserted and the aforesaid plunger advanced.

An additional object is to provide a mechanism of the type mentioned in which the plunger bcomes locked to the mechanism after it has advanced the inserted coin to a given degree, preventing the chain from being withdrawn from the garment by an unauthorized person, the key, however, being removable by the garment owner to hold until he desires to unlock the mechanism for the release of the same.

Another object is to design a mechanism of the above character which is compact, fully enclosed and efficient in operation.

With the above objects in view, a better understanding of the invention may be had by reference to the accompanying drawings, in which—

Fig. 1 is a perspective view of a typical clothes rack showing the aforesaid chains suspended therein and the manner of applying the garment hangers to the rack;

Fig. 2 is an enlarged section of a tubular headpiece for the rack and designed to house a series of the mechanisms under consideration, according to the number of garments for which the rack is equipped;

Fig. 3 is a perspective view of the plunger mentioned before;

Fig. 4 is a section of the rack showing an overcoat hung therein and locked by the chain;

Fig. 5 is a frontal elevation of the headpiece mentioned before as viewed from the section line 5—5 of Fig. 4 on a magnified scale;

Fig. 6 is an enlarged section of one mechanism as seen from the section line 6—6 of Fig. 5;

Fig. 7 is a view similar to Fig 6, minus a side plate, and showing the first stage in the progress of the coin;

Fig. 8 is a view similar to Fig. 7 showing the second stage in the progress of the coin;

Fig. 9 is a perspective view of a spring detent which is visible in side elevation in the upper portion of Fig. 6;

Fig. 10 is a rear view of the mechanism, as seen from the section line 10—10 of Fig. 6, such mechanism being in the normal position;

Fig. 11 is a perspective view of a cross-bolt involved in the mechanism;

Fig. 12 is a view similar to Fig. 10 and partly in section;

Fig. 13 is a view similar to Fig. 12 showing the change of position in parts of the mechanism when the coin has progressed through the same;

Fig. 14 is a side view of a portion of the mechanism as seen from the line 14—14 of Fig. 10;

Fig. 15 is a perspective view from one side of a coin-operated slide;

Fig. 16 is a perspective view of the slide from the opposite side;

Fig. 17 is a plan view of the mechanism as seen from the line 17—17 in Fig. 6;

Fig. 18 is a section of a portion of the mechanism under normal conditions taken on the line 18—18 of Fig. 6;

Fig. 19 is a view similar to Fig. 18, showing the position of parts therein after the coin has been advanced;

Fig. 20 is a perspective view of the left-hand portion of the showing in Fig. 10 with parts omitted for purposes of clarity; and Fig. 21 is a perspective view of a retaining element usable with the novel mechanism for locking hats in a vertical rack shown in the right-hand portion of Fig. 1.

In accordance with the foregoing, specific reference to the drawings indicates the clothes rack at 30, the same having a tubular headpiece 31 from which depends a plate 33 formed with slots 34 into which the clothes hangers 35 are hooked. The headpiece 31 is of hollow, square cross-section, as shown in Fig. 2, and units of the locking mechanism are mounted therein in longitudinal succession. Thus, on the front of the headpiece the coin slots for the mechanism units are indicated at 36, and the key slot at 37. The plate 33 also has keepers 38 for permanently attaching the upper ends of the chains 39, while the lower or free ends thereof carry the plungers 40. Thus, as indicated in Fig. 4, when an overcoat 42 is mounted on a hanger 35, the corresponding chain 39 is passed through the sleeve of the overcoat until the plunger 40 comes into view. The coin is then inserted in the proper slot 36, after which the plunger 40 is inserted with its stem 44 behind the coin and pushed to advance the same into the mechanism. Fig. 5 shows that the normal position of the key 45 for each mechanism is inclined. The cylinder lock is constituted to retain the key in such event against removal. However, when the plunger has been operated as described, the mechanism acts to lock the plunger against removal, and turn the cylinder lock and the key 45 in a clockwise direction, as seen in Fig. 5, to horizontal position. In this position, the key 45 is removable. Thus, the plunger 40 has locked the chain in the closed position—as shown in Fig. 4—so that the garment cannot be removed by an unauthorized person; and the key may be removed by the owner of the garment and held for later use to unlock the mechanism when the garment is to be removed from the rack.

In respect to each unit of the mechanism, it primarily involves an outer side plate 50 which has a frontal right-angle bend 51 welded or otherwise secured to the front wall of the headpiece 31. Next inwardly of the side plate 50 is an assembly of plates forming a guide 52 which is slotted at 53 at the top and bottom to accommodate a horizontally operable slide 55. The guide is also slotted at 57 to afford a horizontally directed passage for the stem 44, such passage being in line with the corresponding coin slot 36. Thus, Fig. 7 shows the coin during its inward travel, and the plunger 40 in front of it. The slide 55 has a side pin 60 slightly above its center, such side pin being in the path of the coin 62. Thus, the propulsion of the latter by the plunger 40 causes the recession of the slide as the coin impinges on the side pin 60. Fig. 8 shows the further progress of the coin through an inclined section 57a of the slot 57, and subject to a cam 57b which starts the coin 62 in a downward course to the extent of becoming free and falling into the bottom of the headpiece 31. The mechanism is therefore free of the coin at this stage of the operation.

Fig. 11 shows a square bolt 65 which is supported on a base plate 66 formed with a downbend 67, the latter being welded to the cross-bend 51 of the plate 50. It is seen from Figs. 14 and 20 that the bolt 65 is guided in front by a block 69 formed with a top lip 70 to hold the bolt 65 down. A rear view of the bolt is shown more clearly in Fig. 12; and the bolt has a pin 72 projecting from the end facing the guide 62.

The slide 55 is normally in the frontal position shown in Fig. 18; and Fig. 14 shows that the slide has a side lug 75 at the rear for connecting one end of a draw spring 76, the other end thereof being attached to a pin 77 carried by the guide 52. The spring 76 therefore maintains the slide in the frontal position mentioned; and in such event Fig. 18 shows that the slide forms a bar to the pin 72 of the bolt 65, which is urged in the direction of the slide. This is done by a torsion spring 80 attached with one end to the plate 66 and having its other end hooked in a loop 81 carried by the bolt 65.

The rearward progress of the slide 55 eventually brings it clear of the bolt pin 72; and at the same time an opening 83 in the plunger stem 44 comes in line with the said pin. Thus, the bolt is caused by the spring 80 to advance to a point placing its pin 72 in front of the slide and through the opening 83. In order to afford a stable position for the outer end of the pin 72, the plate 50 is also formed with an opening 85 similar to the opening 83, so that the outer end of the pin lodges in the opening 85, as shown in Fig. 19. The slide is now held in rearmost position by the pin 72 and the plunger is locked by the latter against withdrawal.

The cylinder lock for the mechanism is shown at 90. Figs. 10 and 12 show the lock in the normal position, where an arm 92 at the rear end of the lock is positioned at an angle spaced ninety degrees clockwise from that of the key slot 37 according to the figures referred to; and the swing of the arm 92 to the vertical position shown in Fig. 13 corresponds to the turning of the key slot to horizontal position.

The lock 90 is adapted to be controlled by the action of the slide 55. It is noted in Fig. 15 that the slide carries a transverse detent 95. The arm 92 of the lock carries a pawl 96, one of whose ends is pivoted at 97 to the arm 92. The opposite end of the pawl carries a side pin 99 extending in the region of the detent 95. Also, the pawl has an upward extension 100 which is connected by a drawspring 102 to the plate 50. Finally, the pawl has a hook 104 at the bottom. It is noted from Figs. 11 and 13 that the bolt 65 has a recess 105 in its top surface, the ends of the recess being oblique. The hook 104 is designed to enter the recess as shown in Fig. 13, the angle of the hook being similar to that of the recess end walls.

Normally, the detent 95 is in the path of the side pin 99 of the pawl 96, as seen in Fig. 17, because the latter is under the drawing influence of the spring 102. However, the backing movement of the slide 55 after the insertion of the coin and plunger stem will carry the detent 95 away from the side pin 99, so that the spring 102 will draw on the pawl 96 and the arm 92 to right the same as in Fig. 13 and locate the key slot 37 in the horizontal position, so that the key 45 may be removed by the garment owner, as stated before.

When the garment is to be taken off the rack, the insertion of the key is necessary and the rotation of the same in a counter-clockwise direction as seen in Fig. 5 must follow. In such event, the action to return the cylinder lock from the position of Fig. 13 to Fig. 12 causes the arm 92 to draw upon the bolt 65 through the agency of the pawl 96 and hook 104. The first effect of this action is to withdraw the end pin 72 from the plunger stem 44, so that the plunger may be drawn out of the rack and the chain 39 pulled out of the garment. The withdrawal of the end pin 72 also releases the slide for return to its frontal position in response to the pull of the drawspring 76. Further, the lateral movement of the pawl causes its side pin 99 to climb an oblique cam 107 bent up from a base 108 fastened to the plate 66. This action raises the hook 104 out of the recess 105 of the bolt 65, so that the latter is returned by the spring 80 to the position where the end pin 72 bears against the side of the slide, as shown in Fig. 18. The mechanism is thus reset for reuse. Finally, as the slide assumes the forward returning movement, it carries the detent 95 back to the position alongside the side pin 99 of the pawl 96—as seen in Figs. 10 and 17—blocking any attempt to turn the key and remove it without the insertion of a coin and the plunger, as stated before, which are the essential controls for backing the detent 95 free of the pin 99.

Since the coin 62 is released from the hand before the plunger 40 is inserted, it is possible for the coin to roll back and drop out of the headpiece 31 in case the rack 30 is slightly tilted forward. To counteract such a tendency, the outer plate 50 of the mechanism receives a wire loop 110 fastened by screws 111. The loop is extended with a spring finger 113 which passes through an opening 114 in the plate 50 to project into the path of the coin 62. Thus, when the latter is inserted, the finger 113 will bear with friction against the side of the coin and prevent its free motion.

It is important that the distance between the pin 60 on slide 55 and the inserted end of plunger 40 be calculated to such a dimension as to insure the unauthorized non-operation of the mechanism. That dimension is obtained in the proper location of a shoulder 120 between the plunger and its stem, so that the plunger reaches the limit of its insertion when the shoulder meets the front of the headpiece 31. Moreover, whatever-sized coin is inserted before the plunger 40, the dimension between pin 60 and the inserted end of plunger stem 44 and opening 83 in plunger 40 are regulated so that when the slide 55 is pushed backward by the coin and plunger stem 44 the bolt pin 72 which rides on slide 55 will be released and moved forward by spring 80 registering and inserting itself in hole 83, thereby locking the plunger 40 and chain 39 in the mechanism.

It is noted in Fig. 1 that the rack 30 is equipped with a side fixture 115. This is an accessory for the mounting of hats, the fixture 115 having a number of openings 116 through which the crown 118 of a hat 119 may be inserted with the opening in front. The fixture carries a number of hasp-like retainers 121, these being hinged at one side as indicated at 122 to the fixture, while the opposite side of the retainer has a hook 123 which enters the hollow of the hat crown when the retainer is closed against it; and such opposite side also carries a short version 39a of the chain 39, plus the plunger 40a. The retainer has a recess 125 for access by means of the key 45 to the key slot of a locking mechanism of the type described before; and the retainer also has an oblong slot 127 adapted to register with a slot 36 in the fixture 115 corresponding to the one in the headpiece of the rack 30, so that the recess 125 and slot 127 occur in handy positions for the insertion of the coin and the plunger stem, as well as for the operation of the key 45.

It will now be apparent that the improved locking mechanism is an efficient unit for coin-controlled facilities offering safety for garments or articles in establishments of the type mentioned. As a matter of convenience, a simple instruction in front of the garment rack should suffice to make the manner of operating the locking facility familiar. To be specific, the instruction need only require the patron to insert the coin, follow with the plunger, note that the key has turned to a horizontal position from the pull of the spring 102, and remove the key. Further, the novel mechanism does not require the patron to deposit the coin in the cavity of a plunger, as is done in many vending machines, in which case the plunger must institute the operation of the mechanism before the coin can be released. In the present case, the coin is the first element inserted; and the coin itself institutes the operation of the mechanism to lock the plunger in the rack. Further, the coin must be advanced to a point where it drops out of the mechanism before the plunger can become locked. Further, the coin is not carried through the interior of the mechanism, and therefore cannot become jammed therein. Further, the coin is advanced by a plunger whose stem is in the plane of the coin and directly in front of the same. Further, the mechanism is in a small and compact unit which operates independently of any other mechanism in the rack and therefore can be removed or serviced without affecting the other mechanisms or their functions. Further the mechanism is complete as a unit and adapted for control by any conventional lock on the market. Finally, the mechanism is composed of relatively few parts which are simple and compactly grouped.

While I have described the invention along specific lines, various minor changes or refinements may be made therein without departing from its principle, and I reserve the right to employ all such changes and refinements as may come within the scope and spirit of the appended claims.

I claim:

1. A coin-operated locking mechanism comprising a support having a frontal coin entrance, a coin slot extending rearwardly from said entrance, a plunger formed with a stem insertible into endwise advancing engagement with a coin when one is inserted into the entrance for moving the coin rearwardly in said slot, a guide parallel to the slot, a slide operable in the guide, means normally drawing the slide to a frontal position, a lateral projection of the slide impinged by the coin to back the slide, a bolt operable in the support crosswise of the slide, second means urging the bolt with one end in engagement with the side of the slide and further to block the front of the slide when the latter has been backed a given distance, the stem having an opening which comes in line with the bolt when it is in the slide-blocking position, and said bolt end entering said opening in such event to lock the plunger against withdrawal, a key-lock carried by the support and having an element undergoing a pivotal movement by the partial turn of an inserted key, a pawl linked to said element and engaging the bolt, such pawl carrying a follower, and an inclined cam mounted on said support and in the path of said follower when the pawl is drawn by said element during its pivotal movement, the effect of the cam being to lift the pawl out of engagement with the bolt, whereby to permit said second means to again urge the bolt as stated.

2. A coin-operated locking mechanism comprising a support having a frontal coin entrance, a coin slot extending rearwardly from said entrance, a plunger formed with a stem insertible into endwise advancing engagement with a coin when one is inserted into the entrance for moving the coin rearwardly in said slot, a guide parallel to the slot, a slide operable in the guide, means normally drawing the slide to a frontal position, a lateral projection of the slide impinged by the coin to back the slide, a bolt operable in the support crosswise of the slide, second means urging the bolt with one end in engagement with the side of the slide and further to block the front of the slide when the latter has been backed a given distance, the stem having an opening which comes in line with the bolt when it is in the slide-blocking position, and said bolt end entering said opening in such event to lock the plunger against withdrawal, a key-lock carried by the support and having an element undergoing a pivotal movement by the partial turn of an inserted key, a pawl linked to said element and seating in a cavity in the surface of the bolt, whereby to back its said end clear of the slide on said movement, said first means then effective to return the slide to the frontal position, such pawl having a side pin, and an inclined cam mounted on said support and in the path of said side pin when the pawl is drawn by said element during its pivotal movement, the effect of the cam being to lift the pawl out of engagement with the bolt, whereby to permit said second means to again urge the bolt as stated.

3. A key-operated locking mechanism utilizing a coin as an intermediate operating part comprising a support member including an elongated transverse slot therethrough for receiving an operating coin therein, an elongated coin guide channel in communicating alignment with said slot and projecting away from said support member, said channel including an uninterrupted top flange and a side portion in substantial coplanar alignment with one side edge of said slot, a slide plate element reciprocably supported on said channel and normally biased into engagement with said support member at said slot, said slide plate element including a side portion substantially coplanar with the side edge of said slot opposite the first mentioned side edge thereof, the side portions of said channel and slide element forming a coin receiving passage therebetween, said slide plate element including an intermediate abutment portion projecting laterally into said passage in longitudinally spaced relation from said slot for engagement by the edge of a coin moved through said passage, a bolt reciprocably mounted on said support member normal to said channel and slot and spring biased toward said channel and overlying relationship with respect to said slot, the terminal end of said bolt normally engaging an intermediate portion of said slide plate element and normally being prevented thereby from entering said passage, and a plunger receivable in said slot for moving a coin longitudinally through said passage into engagement with said slide plate abutment portion to move the slide plate element out of engagement with the terminal end of said bolt to permit it to enter said channel, said plunger including an intermediate transverse aperture alignable with the terminal end of said bolt for receiving the same therethrough.

4. A key operated locking mechanism utilizing a coin as an intermediate operating part comprising a support member including an elongated transverse slot therethrough for receiving an operating coin therein, an elongated coin guide channel in communicating alignment with said slot and projecting away from said support member, said channel including an uninterrupted top flange and a side portion in substantial coplanar alignment with one side edge of said slot, a slide plate element reciprocally supported on said channel and normally biased into engagement with said support member at said slot, said slide plate element including a side portion substantially coplanar with the side edge of said slot opposite the first mentioned side edge thereof, the side portions of said channel and slide element forming a coin receiving passage therebetween, said slide plate element including an intermediate abutment portion projecting laterally into said passage in longitudinally spaced relation from said slot for engagement by the edge of a coin moved through said passage, a bolt reciprocally mounted on said support member normal to said channel and slot and spring biased toward said channel and overlying relationship with respect to said slot, the terminal end of said bolt normally engaging an intermediate portion of said slide plate element and normally being prevented thereby from entering said passage, a plunger receivable in said slot for moving a coin longitudinally through said passage into engagement with said slide plate abutment portion to move the slide plate element out of engagement with the terminal end of said bolt to permit it to enter said channel, said plunger including an intermediate transverse aperture alignable with the terminal end of said bolt for receiving the same therethrough, and a key operated lock mechanism on said support member actuated from a key retaining to a key release position, link means between said bolt and lock mechanism for withdrawing the bolt upon movement of the lock mechanism to a key retaining position, said slide element including a detent portion engageable in the normal position of said slide plate element with said link means to prevent movement of said lock mechanism to the key release position and permitting movement of the lock mechanism to the key release position when a coin is used to displace the slide plate element from its normal position.

5. The structure of claim 3; said coin channel including a downwardly opening coin release slot traversable by said slide plate abutment portion for receiving an operating coin therethrough following movement of said slide plate element to bolt release position.

6. The structure of claim 5; and a key operated lock mechanism on said support member actuated from a key retaining to a key release position, link means between said bolt and lock mechanism for withdrawing the bolt upon movement of the lock mechanism to a key retaining position, said slide element including a detent portion engageable in the normal position of said slide plate element with said link means to prevent movement of said lock mechanism to the key release position and permitting movement of the lock mechanism to the key release position when a coin is used to displace the slide plate element from its normal position.

7. The structure of claim 3; said channel side portion including an opening in alignment with the terminal end of said bolt for receiving the same therein when the bolt extends through said passage and plunger aperture.

References Cited in the file of this patent

UNITED STATES PATENTS

| | | |
|---|---|---|
| 636,962 | Durham | Nov. 14, 1899 |
| 1,142,392 | Bennett | June 8, 1915 |
| 2,818,956 | Lukens | Jan. 7, 1958 |

FOREIGN PATENTS

| | | |
|---|---|---|
| 164 | Great Britain | of 1899 |
| 604,041 | Germany | Oct. 13, 1934 |
| 811,406 | Germany | Aug. 20, 1951 |